3,228,941
6-METHYL- AND 1,6-DIMETHYL-ERGOLINE I DERIVATIVES

Luigi Bernardi, Milan, Germano Bosisio, Palazzolo Milanese, and Bruno Camerino and Onofrio Goffredo, Milan, Italy, assignors to Società Farmaceutici Italia, Milan, Italy, a corporation of Italy
No Drawing. Filed Dec. 27, 1962, Ser. No. 247,499
Claims priority, application Italy, Jan. 11, 1962, 463/62
16 Claims. (Cl. 260—285.5)

Our invention relates to 6-methyl- and 1,6-dimethyl-ergoline I derivatives, which are useful as pharmacologically active substances and as intermediates for the synthesis of other products having therapeutic uses, and to a process for their preparation.

The new compounds, which are an object of our invention, are 6-methyl- and 1,6-dimethyl-ergoline I derivatives having the following structural formula:

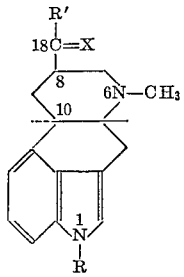

wherein:
R is H or CH$_3$,
R' is CH$_3$ or C$_2$H$_5$,

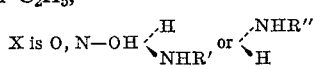

R'' is H, or Ac, and
Ac is the acyl radical of an aliphatic, cycloaliphatic, aromatic or heterocyclic carboxylic acid having from 1 to 10 carbon atoms in the radical.

As far as known, compounds of 6-methyl- and 1,6-dimethyl-ergoline I and II, having a side chain of two or more carbon atoms in the 8-position, have not previously been described.

The process of the invention is essentially in four stages although some of the compounds of the invention result from only some of these stages. The process, as illustrated by the following scheme, comprises reacting 6-methyl- (or 1,6-dimethyl-)-8-carboxamido-(alkylated or not at the amide nitrogen atom)-ergoline I (A) with an alkyl-magnesium halide to afford the corresponding ketone (B) which is thereafter converted into the oxime (C) by reaction with hydroxylamine. By reducing said oxime (C) with sodium or potassium in a lower aliphatic alcohol, the corresponding crude 8-(α-amino-alkyl)-6-methyl- (or 1,6-dimethyl)-ergoline I (D) is obtained, which consists of two stereoisomers at the 17-carbon atom which may be chromatographically separated. The two stereoisomers, respectively called "Rectus" and "Sinister" according ot the convention of Ingold, Cahn and Prelog (Experientia 12, 1956, page 81), may be acylated at the 17-amino group. In the following reaction scheme R, R' and Ac have the significance given above and Y represents two hydrogen atoms or alkyl groups or one of each.

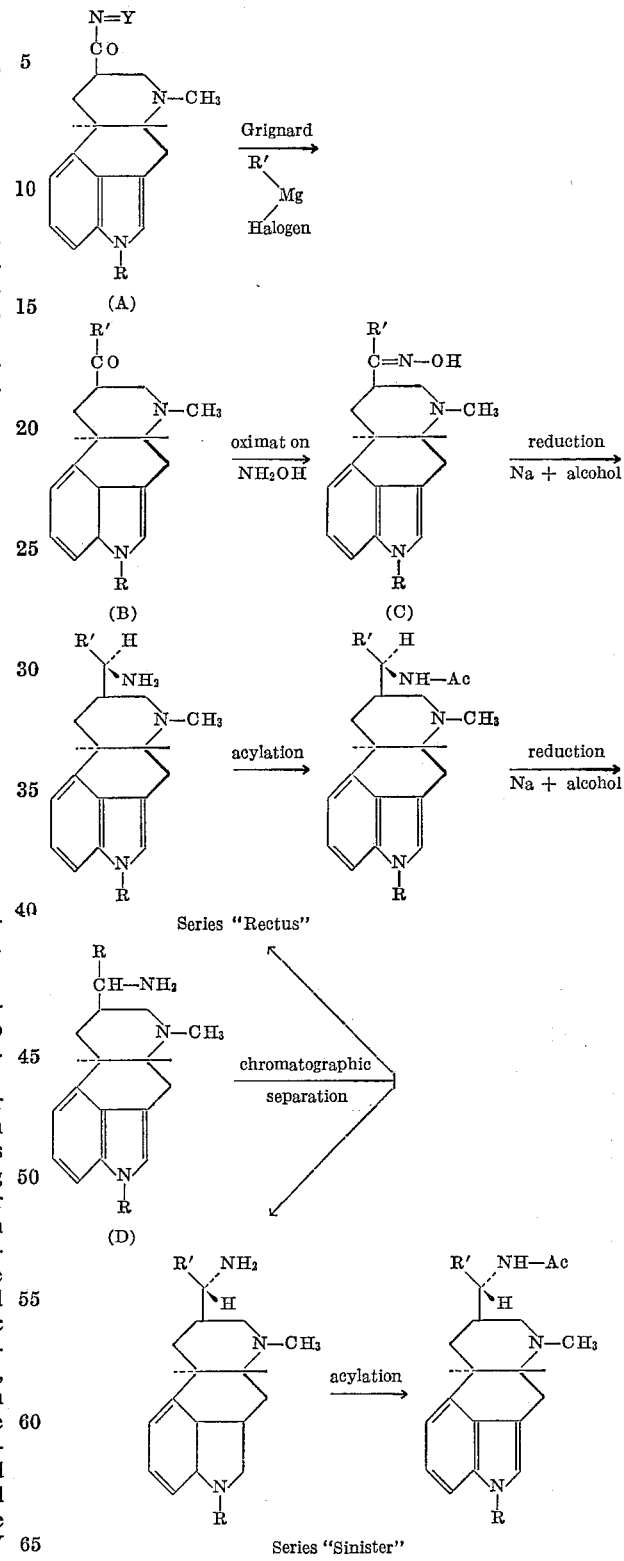

6-methyl- and 1,6-dimethyl-8-carboxamido-ergoline I, the starting materials for the process of the invention, may be in either D or L form or a racemic mixture. The symbol "I" which follows the name of the ergoline derivatives indicates that the hydrogen atom in the 10-position has the α-configuration.

The starting materials (A), dissolved or suspended in an anhydrous organic solvent, such as an aromatic hydrocarbon or ether, e.g. benzene or tetrahydrofuran, are reacted in the warm, preferably at the boiling temperature of the solvent employed, with an excess of Grignard reagent, preferably methyl-magnesium or ethyl-magnesium bromide or iodide for a period from 10 to 30 hours, preferably 20 hours, to yield the corresponding ketone (B). The ketone (B) is isolated from the reaction mixture and purified by crystallization or by chromatography. It has been found that the best results are obtained by employing an excess of Grignard reagent of 10–15 equivalents with respect to the starting material.

The ketone (B) thus obtained is treated with an excess (4–6 equivalents) of hydroxylamine in a lower aliphatic alcohol, such as ethanol, in the warm, preferably under reflux, and the corresponding oxime (C) is isolated and purified in the known manner.

The reduction of said oxime to the corresponding amine (D) is carried out with a reducing agent which is able to reduce the ketoximic group into the amino group, preferably sodium or potassium in a lower aliphatic alcohol such as methanol or ethanol. The reduction may be carried out at room temperature, but is preferably completed in the warm.

The 8-(α-amino-alkyl)-6-methyl (or 1,6-dimethyl)-ergoline I thus obtained is a mixture of two stereoisomer forms at C–17, respectively indicated with R and S (Rectus and Sinister). The two forms may be separated by chromatography and crystallization, as they show a remarkable difference of migration velocity on elution. Each stereoisomer of the R or S form may be acylated in known manner with the anhydride or the chloride of an aliphatic, cycloaliphatic, aromatic and heterocyclic carboxylic acid having from 1 to 10 carbon atoms, in the optimal presence of tertiary amines such as pyridine, homologues thereof and dimethylaniline. The acylation may be carried out also on the mixture of the two stereoisomers R and S and the two stereoisomer acyl derivatives then separated by chromatography. Typical examples of acyl derivates, prepared according to the invention, are those of the following acids: acetic, propionic, butyric, valerianic, hexanoic, heptanoic, octanoic, decanoic, cyclopentanecarboxylic, cyclopentylpropionic, succinic, benzoic, 2,6-dimethoxy-benzoic, 3,4,5-trimethoxybenzoic, phenyl-propionic, phenoxyacetic, α-phenoxy-propionic, ethylcarbamic, nicotinic and their analogues.

The products of the invention are crystalline, colorless or yellow-colored solids, soluble in usual organic solvents and in acids.

The products of the invention show a good pharmacological activity and are particularly useful as oxytocic, antienteraminic, adrenolytic, hypotensive and sedative drugs.

The following examples are intended to illustrate, but not to limit the invention:

EXAMPLE 1

*8-acetyl-6-methyl-ergoline I*

A solution of methylmagnesium bromide (prepared from 12 g. of metallic magnesium) is added dropwise to a boiling suspension of 12 g. of dihydrolysergamide I, prepared by the method of Stoll and Hofmann (Helv. Chim. Acta, 1946, 29, pages 635), in 1200 cc. of anhydrous tetrahydrofuran. The reaction mixture is refluxed for 20 hours. After having decomposed the magnesium complex with an ice cooled solution of ammonium chloride and having separated the organic layer, the mother liquors are extracted with benzene. The extracts are dried over anhydrous sodium sulphate and concentrated in vacuo. A foamy residue, weighing 11.60 g. is obtained. The residue is then taken up with benzene and chromatographed over neutral alumina to yield 3.30 g. of 8-acetyl-6-methyl-ergoline I which melts at 204–206° C.; $[\alpha]_D^{20°} = -870$ (c.=0.3 in pyridine).

EXAMPLE 2

*8-acetyl-6-methyl-ergoline I*

20 g. of diethylamide of dihydrolysergic acid I, prepared by the method of Stoll and Hofmann (Helv. Chim. Acta, 1955, 38, page 421), dissolved in 600 cc. of anhydrous benzene, are poured into 600 cc. of a boiling solution of methylmagnesium bromide in benzene, prepared from 20 g. of metallic magnesium. The mixture is kept at boiling point for 20 hours. After decomposing the magnesium complex with an aqueous solution of ammonium chloride, separating the organic layer and extracting the mother liquors with benzene, the extracts are dried over anhydrous sodium sulphate and concentrated in vacuo. The residue is taken up with 100 cc. of warm ether, and 8-acetyl-6-methyl-ergoline I crystallizes out. 10.19 g. are obtained, melting at 204–206° C.;

$$[\alpha]_D^{20°} = -85°$$

(c.=0.28 in pyridine).

The mother liquors chromatographed over neutral alumina give a further 1.170 g. of product, melting at 203–205° C.

EXAMPLE 3

*8-acetyl-1,6-dimethyl-ergoline I*

Into 700 cc. of a boiling solution of methylmagnesium bromide in benzene (prepared from 24 g. magnesium) there are poured 24 g. of diethylamide of 1-methyl-dihydrolysergic acid I, prepared by the method of Troxler and Hofmann (Helv. Chim. Acta, 1957, 40, page 1721), dissolved in 700 cc. of anhydrous benzene. The reaction mixture is refluxed for 20 hours. After decomposing the magnesium complex with an aqueous solution of ammonium chloride and separating the benzene layer, the moter liquors are further extracted with benzene, the combined extracts are dried over anhydrous sodium sulphate and are concentrated in vacuo. The residue is taken up with benzene and chromatographed over neutral alumina to give 11.41 g. of 8-acetyl-1,6-dimethyl-ergoline I melting at 97–100° C.; $[\alpha]_D^{20°} = -87°$ (c.=0.38 in pyridine).

EXAMPLE 4

*Oxime of 8-acetyl-6-methyl-ergoline I*

8-acetyl-6-methyl-ergoline I oxime is obtained by warming, on a water bath for 10 minutes, a solution of 10 g. of 8-acetyl-6-methyl-ergoline I in 650 cc. of ethanol containing 12 g. of hydroxylamine. The reaction mixture is thereafter kept at room temperature for two days. 9.63 g. of oxime are obtained, which upon recrystallization from ethanol melts at 252–254° C.; $[\alpha]_D^{20°} = -115°$ (c.=0.21 in pyridine).

EXAMPLE 5

*Oxime of 8-acetyl-1,6-dimethyl-ergoline I*

4 g. of 8-acetyl-1,6-dimethyl-ergoline I are dissolved in 280 cc. of ethanol containing 5 g. of hydroxylamine, refluxed for 10 minutes, and kept at room temperature for two days. 3.42 g. of oxime of 8-acetyl-1,6-dimethyl-ergoline I are obtained, melting at 247–249° C.;

$$[\alpha]_D^{20°} = -115°$$

(c.=0.32 in pyridine).

EXAMPLE 6

*(17 R) and (17 S)-8-(α-amino-ethyl)-6-methyl-ergoline I*

8 g. of metallic sodium are gradually added during about 2 hours to a solution of 2 g. of oxime of 8-acetyl-6-methyl-ergoline I in 80 cc. of boiling absolute ethanol. After the addition is completed, the reaction mixture is diluted with 40 cc. of boiling absolute ethanol and 4 g. of metallic sodium are added during 1 hour. The mixture is then kept warm until the sodium is completely dissolved. The mixture is then cooled to about 50° C., and the sodium ethylate is almost completely neutralized with 25% aqueous acetic acid. The amine, extracted with chloroform, is washed with a dilute solution of sodium bicarbonate and then with water. The solution is concentrated in vacuo and a foamy brown residue, weighing 1.92 g., is obtained. This product consists of a mixture of two stereoisomers with stereoisomerism at the 17-carbon atom. The two forms may be separated by chromatography and crystallization because they show a remarkable difference of migration velocity in the elution. The chromatographic separation is performed over an activated magnesium silicate, such as Florisil, with chloroform-ethyl ether as eluent.

The two stereoisomeric forms have been assigned their configuration after chemico-physical investigations. According to the convention of Ingold, Cahn and Prelog (Experientia 12, 1956, page 81) the configuration R (=Rectus) has been given to the most mobile amine, melting at 223–225° C.; $[\alpha]_D^{20°} = -135°$ (c.=0.27 in pyridine), and the configuration S (=Sinister) to the less mobile amine, melting at 226–229° C.; $[\alpha]_D^{20°} = -139°$ (c.=0.3 in pyridine). The structural formulae are as follows:

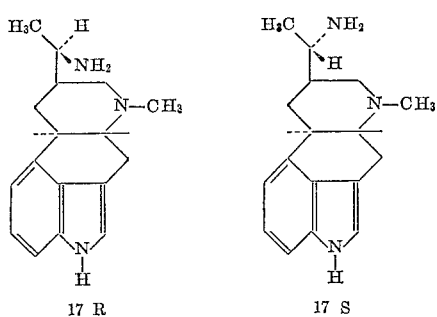

17 R  17 S

The weight ratio of the two amines is about 60% of amine R to 40% of amine S.

EXAMPLE 7

*(17 R) and (17 S)-8-(α-amino-ethyl)-1,6-dimethyl-ergoline I*

To 2 g. of oxime of 8-acetyl-1,6-dimethyl-ergoline I, prepared as described in Example 5, dissolved in 80 cc. of boiling ethanol, 8 g. of metallic sodium are added during about 2 hours. When the addition is over, a further 40 cc. of ethanol are added and the whole kept boiling while a further 4 g. of metallic sodium are added during about 1 hour. At the end of the addition, the mixture is refluxed until the sodium disappears. The reaction mixture is cooled and the pH is adjusted to about 8 with 25% aqueous acetic acid. The amine is extracted with chloroform and the extract is washed with sodium bicarbonate solution, dried and finally evaporated to dryness in vacuo. 1.98 g. of an oily orange residue is obtained. By carrying out the chromatographic separation by the same technique as described in Example 6, two amines (17 R) and (17 S) having the following structural formulae are obtained:

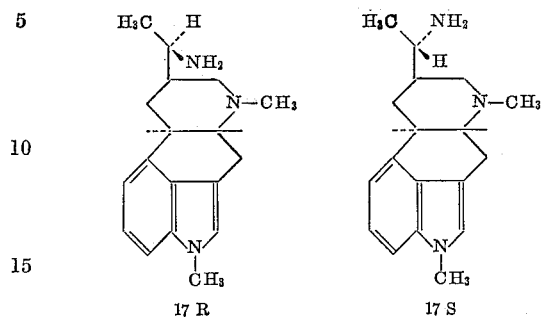

17 R  17 S

EXAMPLE 8

*(17 R)-8-(α-acetyl-amino-ethyl)-6-methyl-ergoline I*

A solution of 0.35 g. of (17 R)-8-(α-amino-ethyl)-6-methyl-ergoline I, dissolved in 2.5 cc. of anhydrous pyridine, is cooled to about −10° C. and 0.25 cc. of acetyl chloride are added. The reaction mixture is kept at this temperature for 20 minutes and then at room temperature for a further 20 minutes. The mixture, diluted with chloroform and a small amount of methanol, is washed with aqueous sodium hydroxide solution, with sodium bicarbonate solution and finally with water. After distilling off the solvent in vacuo, the residue is crystallized from acetone-petroleum ether. 0.27 g. of (17 R)-8-(α-acetyl-amino-ethyl)-6-methyl-ergoline I, melting at 256–257° C. are obtained; $[\alpha]_D^{20°} = -44°$ (c.=0.27 in pyridine).

EXAMPLE 9

*(17 S)-8-(α-acetylamino-ethyl)-6-methyl-ergoline I*

By operating in the same way as in Example 8, from 0.35 g. of (17 S)-8-(α-amino-ethyl)-6-methyl-ergoline I in 2.5 cc. anhydrous pyridine and 0.25 cc. of acetyl chloride, and by recrystallization from acetone-petroleum ether, 0.24 g. of (17 S)-8-(α-acetylamino-ethyl)-6-methyl-ergoline I, melting at 175–176° C. are obtained;

$$[\alpha]_D^{20°} = -116°$$

(c.=0.23 in pyridine).

EXAMPLE 10

*(17 R) and (17 S)-8-(α-acetylamino-ethyl-6-methyl-ergoline I*

By operating in the same way as in Example 8, from 1 g. of a mixture of 17 R and 17 S amine, prepared as described in Example 6, in 7 cc. of anhydrous pyridine and 0.7 cc. of acetyl chloride, and after chromatography of the crude product over neutral alumina and elution with chloroform-benzene, two acetyl derivatives are obtained:

(17 R)-8-(α-acetylamino-ethyl)-6-methyl-ergoline I; melting point 256–257° C.; $[\alpha]_D^{20°} = -44°$ (c.=0.27 in pyridine);

(17 S)-8-(α-acetylamino-ethyl)-6-methyl-ergoline I; melting point 175–176° C.; $[\alpha]_D^{20°} = -116°$ (c.=0.23 in pyridine).

EXAMPLE 11

*(17 R)-8-(α-benzoylamino-ethyl)-6-methyl-ergoline I*

By operating in the same way as in Example 8, from 0.35 g. of (17 R)-8-(α-amino-ethyl)-6-methyl-ergoline I in 2.5 cc. of anhydrous pyridine and 0.7 cc. of benzoyl chloride, and by recrystallization from benzene-petroleum ether, 0.21 g. of (17 R)-8-(α-benzoylamino-ethyl)-6-methyl-ergoline I are obtained; melting point 138–140° C.; $[\alpha]_D^{20°} = -153°$ (c.=0.28 in pyridine).

EXAMPLE 12

*(17 S)-8-(α-benzoylamino-ethyl)-6-methyl-ergoline I*

By operating in the same way as in Example 8, from 0.350 g. of (17 S)-8-(α-amino-ethyl)-6-methyl-ergoline I in 2.5 cc. of anhydrous pyridine and 0.7 cc. of benzoyl chloride, and by crystallization from benzene-petroleum ether, 0.190 g. of (17 S)-8-α-benzoylamino-ethyl) - 6-methyl-ergoline I are obtained, melting at 149–150° C.; $[\alpha]_D^{20°} = -40°$ (c.=0.23 in pyridine).

EXAMPLE 13

*(17 R)-8-(α-ethoxycarbamido-ethyl)-6-methyl-ergoline I*

The preparation is carried out as in Example 8, from 0.350 g. of (17 R)-8-(α-amino-ethyl)-6-methyl-ergoline I in 2.5 cc. of anhydrous pyridine and 0.25 cc. of ethyl chlorocarbonate, and by crystallization from benzene-petroleum ether, 0.190 g. of (17 R)-8-(α-ethoxy - carb-amido-ethyl)-6-methyl-ergoline I are obtained, melting at 87–91° C. with decomposition; $[\alpha]_D^{20°} = -81°$ (c.=0.3% in pyridine).

EXAMPLE 14

*(17 R) and (17 S)-8-(α-acetylamino)-1,6-dimethyl-ergoline I*

1.980 g. of 8-(α-amino-ethyl)-1,6-dimethyl-ergoline I, dissolved in 15 cc. of anhydrous pyridine, are cooled to about −10° C. and 1.5 cc. of acetyl chloride are added. The reaction mixture is kept at this temperature for 20 minutes and then at room temperature for a further 20 minutes. The mixture is diluted with chloroform and a small amount of methanol, is then washed with an aqueous solution of sodium hydroxide, a solution of sodium bicarbonate and finally with water. The solvent is removed in vacuo and a foamy residue is obtained, which is taken up with benzene and chromatographed over neutral alumina and then eluted with chloroformbenzene. By crystallizing the two eluates, respectively (17 R)-8-(α-acetyl-amino-ethyl)-1,6-dimethyl-ergoline I, melting at 224–226° C., $[\alpha]_D^{20°} = -52°$ (c.=0.29 in pyridine), and (17 S)-8-(α-acetyl-amino-ethyl)-1,6-dimethyl-ergoline I, melting at 247–249° C., $[\alpha]_D^{20°} = -104°$ (c.=0.38 in pyridine), are obtained.

EXAMPLE 15

*8-(α-amino-propyl)-6-methyl-(and 1,6-dimethyl)-ergoline I derivatives*

The preparation of these derivatives, which are the higher homologues of 8-(α-amino-ethyl)-6-methyl (or 1,6-dimethyl)-ergoline I derivatives, is carried out by reacting dihydrolysergamide or 1-methyl-dihydrolysergamide or their N-alkyl derivatives at the amide nitrogen with ethyl-magnesium bromide, instead of methyl-magnesium bromide and then as in the appropriate previous example.

We claim:
1. A compound of the formula:

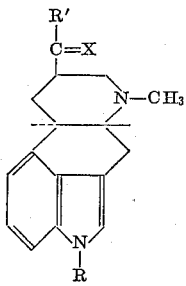

wherein:
R is selected from the group consisting of H and CH₃,
R' is selected from the group consisting of CH₃ and C₂H₅, X is selected from the group consisting of O, N—OH, $\begin{smallmatrix}H\\\diagdown NHR''\end{smallmatrix}$ and $\begin{smallmatrix}NHR''\\\diagup H\end{smallmatrix}$ R'' is selected from the group consisting of hydrogen and an acyl group of
 (a) substituted and unsubstituted saturated aliphatic acid with up to 3 carbon atoms, wherein the substituent is selected from the group consisting of phenyl and phenoxy;
 (b) substituted and unsubstituted benzoic acid, wherein the substituent is methoxy; and
 (c) nicotinic acid.

2. 8-acetyl-6-methyl-ergoline I.
3. 8-acetyl-1,6-dimethyl-ergoline I.
4. Oxime of 8-acetyl-6-methyl-ergoline I.
5. Oxime of 8-acetyl-1,6-dimethyl-ergoline I.
6. (17 R)-8-(α-amino-ethyl)-6-methyl-ergoline I.
7. (17 S)-8-(α-amino-ethyl)-6-methyl ergoline I.
8. (17 R)-8-(α-amino-ethyl)-1,6-dimethyl-ergoline I.
9. (17 S)8-(α-amino-ethyl)-1,6-dimethyl-ergoline I.
10. (17 R)-8-(α-acetylamino-ethyl)-6-methyl-ergoline I.
11. (17 S)-8-(α-acetylamino-ethyl)-6-methyl-ergoline I.
12. (17 R)-8-(α-acetylamino-ethyl)-1,6-dimethyl-ergoline I.
13. (17 S)-8-(α-acetylamino-ethyl)-1,6-dimethyl-ergoline I.
14. (17 R)-8-(α-benzoylamino-ethyl)-6-methyl - ergoline I.
15. (17 S)-8-(α-benzoylamine-ethyl)-6-methyl - ergoline I.
16. (17R)-8-(α-ethoxycarbamido-ethyl)-6-methyl-ergoline I.

References Cited by the Examiner

Burger: Medicinal Chemistry, pages 585–6 and 622 (1960).

Stoll: Chemical Reviews, volume 47, pages 197–218, (1950).

NICHOLAS S. RIZZO, *Primary Examiner.*